(12) United States Patent
Lummerstorfer et al.

(10) Patent No.: US 10,308,797 B2
(45) Date of Patent: Jun. 4, 2019

(54) POLYPROPYLENE COMPOSITIONS FOR AUTOMOTIVE APPLICATIONS

(71) Applicant: BOREALIS AG, Vienna (AT)

(72) Inventors: Thomas Lummerstorfer, Gramastetten (AT); Georg Grestenberger, St. Peter in der AU (AT); Michael Tranninger, Pucking (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 15/764,828

(22) PCT Filed: Sep. 28, 2016

(86) PCT No.: PCT/EP2016/073092
§ 371 (c)(1),
(2) Date: Mar. 29, 2018

(87) PCT Pub. No.: WO2017/060139
PCT Pub. Date: Apr. 13, 2017

(65) Prior Publication Data
US 2018/0319967 A1    Nov. 8, 2018

(30) Foreign Application Priority Data
Oct. 6, 2015   (EP) .................................... 15188576

(51) Int. Cl.
C08L 23/14     (2006.01)
C08L 23/12     (2006.01)

(52) U.S. Cl.
CPC ............... *C08L 23/14* (2013.01); *C08L 23/12* (2013.01); *C08L 2205/025* (2013.01); *C08L 2205/03* (2013.01); *C08L 2205/035* (2013.01); *C08L 2207/02* (2013.01)

(58) Field of Classification Search
CPC ............... C08L 23/14; C08L 2205/025; C08L 2207/02; C08L 2205/035; C08L 2205/03
See application file for complete search history.

(56) References Cited

U.S. PATENT DOCUMENTS

| | | | |
|---|---|---|---|
| 5,705,234 A | 1/1998 | Yamamoto et al. | |
| 6,048,942 A | 4/2000 | Buehler et al. | |
| 2005/0267261 A1 | 12/2005 | Plaver | |
| 2017/0002188 A1* | 1/2017 | Neuteboom | ............ C08L 23/12 |

FOREIGN PATENT DOCUMENTS

| CN | 103080212 A | 5/2013 |
|---|---|---|
| CN | 104884525 A | 9/2015 |
| EP | 0491566 A2 | 6/1992 |
| EP | 0618259 A2 | 12/1994 |
| EP | 0887379 A1 | 12/1998 |
| EP | 1040162 B1 | 10/2000 |
| EP | 2197947 B1 | 6/2010 |
| EP | 2423257 A1 | 2/2012 |
| JP | 2000-13904 A | 5/2000 |
| JP | 2005-336390 A | 12/2005 |
| JP | 2008-13757 A | 1/2008 |
| JP | 2009-079117 A | 4/2009 |
| JP | 2009-173904 A | 8/2009 |
| JP | 2014-71277 A | 4/2014 |
| JP | 2014-071277 A | 4/2014 |
| JP | 2015-13363 A | 6/2015 |
| JP | 2015-518079 A | 6/2015 |
| JP | 2015-193695 A | 11/2015 |
| JP | 2017-019975 A | 1/2017 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 99/24478 A1 | 5/1999 |
| WO | 99/24479 A1 | 5/1999 |
| WO | 00/68315 A1 | 11/2000 |
| WO | 2004/000899 A1 | 12/2003 |
| WO | 2004/111095 A1 | 12/2004 |
| WO | 2012/102050 A1 | 8/2012 |
| WO | 2015/077902 A1 | 6/2015 |
| WO | 2015/089688 A1 | 6/2015 |
| WO | 2015/091151 A1 | 6/2015 |

OTHER PUBLICATIONS

Extended European Search Report for Application No. 15188576. 1-1302.
International Search Report PCT/EP2016/073092.
Office action for Japanese Patent Application No. 2018-512294, dated Aug. 21, 2018.
Office action for Chinese Patent Application No. 2016800570676, dated Nov. 15, 2018.

* cited by examiner

*Primary Examiner* — Robert D. Harlan
(74) *Attorney, Agent, or Firm* — Tarolli, Sundheim, Covell & Tummino LLP

(57) ABSTRACT

The present invention relates to novel polypropylene compositions suitable for automotive applications, having a good balance of mechanical properties and especially low gloss. The inventive compositions are characterized by at least two heterophasic propylene copolymers (HECOs), where at least one of the HECOs is characterized by a rather high molecular weight rubber, an ethylene-α-olefin elastomer (EOE) having a rather low melt flow rate MFR2 (190° C.) and a specific ratio between the MFR of the ethylene-α-olefin elastomer (EOE) and of at least one of the heterophasic propylene copolymers (HECOs).

11 Claims, No Drawings

POLYPROPYLENE COMPOSITIONS FOR AUTOMOTIVE APPLICATIONS

The present invention is directed to novel polypropylene compositions suitable for automotive applications.

Polypropylene (PP) is nowadays the polymer of choice for automobile parts like bumpers, door panels, and dash boards. In particular heterophasic propylene copolymers (HECOs) are suitable as they combine stiffness with good impact behavior. Heterophasic propylene copolymers (HECOs) are well known in the art. Such heterophasic propylene copolymers (HECOs) comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term inclusion indicates that the matrix and the inclusion form different phases within the heterophasic propylene copolymer (HECO), said inclusions are for instance visible by high resolution microscopy, like electron microscopy or scanning force microscopy.

Automotive parts like dashboards, door claddings, or trims are commonly made from propylene based resins. In particular thermoplastic polyolefin compounds often including a filler such as talc are widely used for these applications. For automotive interior parts it is often tried to mimic a leather- or fabric-like surface and touch in order to give car passengers a high-quality impression of the car interior. As a consequence, materials should provide a very low surface gloss level. Additionally, the usual requirements for automotive applications, like low density, low shrinkage, high stiffness, high impact strength and good flowability, must be fulfilled.

The question of "low-gloss polymer surfaces" is a general one, and prior art exists for several different polymers. For polypropylene, several possible approaches for achieving high quality low-gloss surfaces on injection molded articles have been described:

EP 618259 discloses "Thermoplastic elastomer, composition therefor and production process thereof, as well as molded or otherwise formed product obtained from the thermoplastic elastomer" in which (partially) crosslinked diene components are used.

U.S. Pat. No. 6,048,942 relates to "Thermoplastic olefin articles having high surface gloss and mar resistance". The thermoplastic olefin compositions are said to be useful for making molded articles with high surface gloss and mar resistance and include (1) about 10 to about 90 parts of a propylene homopolymer, copolymer, or terpolymer, (2) about 90 to about 10 parts of either an olefin polymer composition that contains a low molecular weight ethylene copolymer rubber; an elastomeric copolymer of ethylene and a $C_3$-$C_8$ α-olefin made with a metallocene catalyst, or a mixture of the two, and (3) about 0.1 to about 10 parts of a lubricant per hundred parts of (1) plus (2).

EP 1040162 discloses "Thermoplastic polymer compositions" based on PP. These compositions are said to be suitable for thermoforming which demonstrates good grain retention at thin gauges, low gloss and whose cost is competitive for many applications, particularly in the automotive industry. The compositions contain (a) 10-35 wt. % of polypropylene or an ethylene/propylene copolymer, (b) 0-30 wt. % uncrosslinked ethylene propylene copolymer rubber having an ethylene content 60-80 wt. %, (c) 10-25 wt. % of an ionomeric copolymer of ethylene and an α,β-unsaturated $C_3$-$C_8$ carboxylic acid, (d) 2-6 wt. % of a copolymer of ethylene and glycidyl acrylate or glycidyl methacrylate, (e) 5-20 wt. % polyethylene, and (f) 0-25 wt. % of an ethylene alpha-olefin copolymer elastomer.

US 2005/0267261 relates to "Low gloss thermoplastic polyolefin composition" with two different types of elastomers differing in the Mooney viscosity. Despite the fact that the US 2005/0267261 intends to provide "low gloss" compositions, the actually achieved gloss values are not acceptable for today's automotive interior applications.

EP 2197947 relates to a "Polypropylene Resin Composition". It describes the combination of a high-impact PP copolymer with a plastomer, a mineral filler and a surface modifier (such as fatty acid amides or monoglycerides) to achieve the targeted property combination within which low gloss and high scratch resistance are desired. For improving scratch resistance, a modified PP such as a fatty acid anhydride-modified PP is used. Also here, the gloss values are not acceptable for today's automotive interior applications.

An alternative approach is the application of a low-gloss cover layer (paint, varnish) to the polymer part as, for example, described in U.S. Pat. No. 5,750,234 relating to "Interior automotive laminate with thermoplastic low gloss coating"), but such an approach will necessarily increase the system cost.

It is further desirable that polypropylene compositions for automotive interior applications have rather low density and low shrinkage. Low density is required for light weight automotive parts, low shrinkage is a necessary prerequisite for precise geometry of automotive parts. Achieving these two properties is usually mutually exclusive.

It is still further desirable that polypropylene compositions for automotive interior applications have rather high impact strength and stiffness. Again, achieving both of these features to a high extent is usually not possible.

There remains a need for polypropylene compositions for automotive interior applications having very low gloss, low shrinkage, but also low density and high impact strength, particularly at ambient temperature, but also rather high stiffness.

The present inventors surprisingly found that the combination of two heterophasic propylene copolymers having specific properties, together with certain types of ethylene-α-olefin copolymers of rather high molecular weight does give the intended property profile to an unprecedented extent.

Thus, the present invention relates to a polypropylene composition (PPC) having a melt flow rate $MFR_2$ (230° C.) measured according to ISO 1133 of ≥9.0 g/10 min, the composition comprising a) at least two heterophasic propylene copolymers (HECOs), wherein the at least two heterophasic propylene copolymers (HECOs) are contained in a total amount of at least 50 wt %, based on the total weight of the composition, b) an ethylene-α-olefin elastomer (EOE) having a melt flow rate $MFR_2$ (190° C.) measured according to ISO 1133 of <0.5 g/10 min, c) wherein the ratio of the $MFR_2$ of at least one of the at least two heterophasic propylene copolymers (HECOs) to the $MFR_2$ of the ethylene-α-olefin elastomer (EOE) [$MFR_2$(HECO)/$MFR_2$(EOP)] is in the range of 2/1 to 100/1, and d) wherein the intrinsic viscosity (IV) measured according to ISO 1628-1 (decalin) of the xylene cold soluble (XCS) fraction of at least one of the at least two heterophasic propylene copolymers (HECOs) is ≥2.5 dl/g.

Heterophasic propylene copolymers (HECOs) are known in the art and are widely used in the automotive industry. The expression "heterophasic" indicates that an elastomeric copolymer, preferably an elastomeric propylene copolymer, is (finely) dispersed in a matrix. In other words the elastomeric copolymer forms inclusions in the matrix. Thus the matrix contains (finely) dispersed inclusions being not part of the matrix and said inclusions contain the elastomeric copolymer. The term "inclusion" according to this invention shall preferably indicate that the matrix and the inclusion form different phases within the heterophasic propylene copolymer, said inclusions are for instance visible by high resolution microscopy, like electron microscopy or scanning force microscopy.

The overall $MFR_2$ (230° C.) of the polypropylene composition (PPC) should be at least 9.0 g/10 min, preferably from 9.0 to 40.0 g/10 min, more preferable 9.0-30.0, still more preferable 9.5-25.0, even more preferable 10.0-20.0 g/10 min.

Since the inventive polypropylene compositions are mainly used for injection molding, the above mentioned MFR range ensures sufficient flowability in the injection molding process.

The total amount of the at least two heterophasic propylene copolymers (HECOs), based on the total weight of the polypropylene composition (PPC) shall be at least 50 wt %. This minimum amount of heterophasic propylene copolymers (HECOs) is required to ensure the basic properties of the polypropylene composition (PPC), like e.g. stiffness.

It is a further requirement, that the molecular weight of the ethylene-α-olefin elastomer (EOE) is rather high. This is expressed by an $MFR_2$ (190° C.) of the ethylene-α-olefin elastomer (EOE) of smaller than 0.5 g/10 min, preferably from 0.05-0.50, more preferably from 0.10-0.45, still more preferably from 0.15-0.40 g/10 min, most preferably from 0.20-0.40 g/10 min.

It is further believed by the inventors that it is necessary to achieve a good dispersion of the ethylene-α-olefin elastomer (EOE) in the at least two heterophasic propylene copolymers (HECOs). In order to accomplish this, it is believed to be necessary that the ratio of the $MFR_2$ of at least one of the at least two heterophasic propylene copolymers (HECOs) to the $MFR_2$ of the ethylene-α-olefin elastomer (EOE) [$MFR_2$(HECO)/$MFR_2$(EOP)] is not outside a certain range. Thus, the [$MFR_2$(HECO)/$MFR_2$(EOP)] is in the range of 2/1 to 100/1, preferably 3/1 to 80/1, more preferably 5/1 to 50/1, still more preferably 8/1 to 30/1, most preferably in the range of 10/1 to 20/1.

For a similar reason as above and also in order to contribute to the very low gloss of the inventive polypropylene composition (PPC) the intrinsic viscosity (IV) measured according to ISO 1628-1 (decalin) of the xylene cold soluble (XCS) fraction of at least one of the at least two heterophasic propylene copolymers (HECOs) is ≥2.5 dl/g, preferably ≥2.7 dl/g, more preferably ≥2.9 dl/g, still more preferably ≥3.0 dl/g, most preferably ≥3.1 dl/g.

According to an embodiment of the present invention,
a) the at least two heterophasic propylene copolymers (HECOs) are contained in a total amount of 55-85 wt % and/or
b) the ethylene-α-olefin elastomer (EOE) is contained in an amount of 5-25 wt %, based on the total weight of the composition.

Preferably the total amount of heterophasic propylene copolymers (HECOs) is from 60-80 wt %, more preferably from 65-78 wt %, most preferably from 68-75 wt %, based on the total weight of the composition.

It is further preferred that the amount of ethylene-α-olefin elastomer (EOE) is from 7-22 wt %, more preferably from 9-20 wt %, most preferably from 11-19 wt %, based on the total weight of the composition.

Advantageous combinations of the respective amounts of heterophasic propylene copolymers (HECOs) and ethylene-α-olefin elastomer (EOE) are preferably from 60-80 wt % of HECOs and 7-22 wt % of EOP, more preferably from 65-78 wt % of HECOs and 9-20 wt % of EOP, most preferably from 68-75 wt % of HECOs and from 11-19 wt % of EOP, like 71-74 wt % of HECOs and 14-17 wt % of EOP.

For achieving the effects of the invention it is beneficial when the heterophasic propylene copolymers (HECOs) are present in the inventive polyproypelene composition in a certain ratio.

Thus, according to an embodiment of the present invention, the polypropylene composition (PPC) comprises a first heterophasic propylene copolymer (HECO-1) and a second heterophasic propylene copolymer (HECO-2), wherein further the weight ratio between the first heterophasic propylene copolymer (HECO-1) and the second heterophasic propylene copolymer (HECO-2) [(HECO-1)/(HECO-2)] is in the range of 4/1 to 1/2.

Preferably the weight ratio [(HECO-1)/(HECO-2)] is in the range of 3/1 to 1/2, more preferably it is in the range of 2/1 to 1/2, most preferably it is in the range of 1.5/1 to 1/1.5, still more preferably in the range of 1.2/1 to 1/1.2, like about 1/1.

It is further appreciated that not only the relative amounts of the first and second heterophasic propylene copolymer are relevant for the invention, but also their relative content in the polypropylene composition (PPC).

Therefore, according to a further embodiment
a) the first heterophasic propylene copolymer (HECO-1) is contained in an amount of 20-75 wt % and/or
b) the second heterophasic propylene copolymer (HECO-2) is contained in an amount of 15-50 wt %, based on the total weight of the composition.

Preferably, the first heterophasic propylene copolymer (HECO-1) is contained in an amount of 25-65 wt %, more preferably 28-55 wt %, still more preferably 31-50, most preferably of 34-45 wt %, based on the total weight of the composition.

Further, it is preferred that the second heterophasic propylene copolymer (HECO-2) is contained in an amount of 15-45 wt %, more preferably of 20-45 wt %, most preferably of 25-40 wt %, based on the total weight of the composition.

Preferred advantageous combinations of the above amounts of HECO-1 and HECO-2 are 25-65 wt % HECO-1 and 15-45 wt % HECO-2, more preferably 31-50 wt % HECO-1 and 20-45 wt % HECO-2, most preferably 34-45 wt % HECO-1 and 25-40 wt % HECO-2, based on the total weight of the composition.

The first heterophasic propylene copolymer (HECO-1) has
a) a melt flow rate $MFR_2$ (230° C.) measured according to ISO 1133 of 50-500 g/10 min, and/or
b) a xylene cold soluble fraction (XCS) of 10.0 to 30.0 wt.-%, and/or
c) a total propylene content of 75.0 to 97.0 wt.-%, and/or
(d) a propylene content in the xylene cold soluble (XCS) fraction of 55.0 to 75.0 wt.-% and/or
e) an intrinsic viscosity (IV) measured according to ISO 1268-1 (decalin) of the xylene cold soluble (XCS) fraction of 1.5-4.0 dl/g.

The first heterophasic propylene copolymer (HECO-1) exhibits a relatively high melt flow to ensure that the final composition according to the invention is featured by a sufficiently high melt flow. The heterophasic propylene copolymer (HECO-1) according to this invention has preferably a melt flow rate $MFR_2$ (230° C.) measured according to ISO 1133 in the range of 65.0 to 300.0 g/10 min, more preferably in the range of 75.0 to 200.0 g/10 min, still more preferably 85.0 to 180.0 g/10 min, most preferably of 90.0 to 120 g/10 min.

The heterophasic propylene copolymer (HECO-1) according to this invention preferably comprises
(a) a polypropylene matrix (M-PP1) and
(b) an elastomeric propylene copolymer (E-PP1) comprising units derived from
propylene and
ethylene and/or $C_4$ to $C_{12}$ α-olefin.

Preferably the propylene content in the heterophasic propylene copolymer (HECO-1) is 75.0 to 97.0 wt %, more preferably 80.0 to 96.0 wt %, most preferably 85.0 to 94.0 wt % based on the total heterophasic propylene copolymer (HECO-1), more preferably based on the amount of the polymer components of the heterophasic propylene copolymer (HECO-1), yet more preferably based on the amount of the polypropylene matrix (M-PP1) and the elastomeric propylene copolymer (E-PP1) together. The remaining part constitutes the comonomers, preferably ethylene.

As defined herein a heterophasic propylene copolymer (HECO-1) comprises as polymer components only the polypropylene matrix (M-PP1) and the elastomeric copolymer (E-PP1). In other words the heterophasic propylene copolymer (HECO-1) may contain further additives but no other polymer in an amount exceeding 5 wt %, more preferably exceeding 3 wt %, like exceeding 1 wt %, based on the total heterophasic propylene copolymer (HECO-1), more preferably based on the polymers present in the heterophasic propylene copolymer (HECO-1). One additional polymer which may be present in such low amounts is a polyethylene which is a reaction product obtained by the preparation of the heterophasic propylene copolymer (HECO-1). Accordingly it is in particular appreciated that a heterophasic propylene copolymer (HECO-1) as defined in the instant invention contains only a polypropylene matrix (M-PP1), an elastomeric propylene copolymer (E-PP1) and optionally a polyethylene in amounts as mentioned in this paragraph. Further, throughout the present description the xylene cold insoluble (XCI) fraction represents the polypropylene matrix (M-PP1) and optionally the polyethylene of the heterophasic propylene copolymer (HECO-1) whereas the xylene cold soluble (XCS) fraction represents the elastomeric part of the heterophasic propylene copolymer (HECO-1), i.e. the elastomeric propylene copolymer (E-PP1).

Accordingly the polypropylene matrix (M-PP1) content, i.e. the xylene cold insoluble (XCI) content, in the heterophasic propylene copolymer (HECO-1) is preferably in the range of 70.0 to 90.0 wt %, more preferably in the range of 75.0 to 90.0 wt %, most preferably of 80.0 to 88.0 wt %. In case polyethylene is present in the heterophasic propylene copolymer (HECO-1), the values for the polypropylene matrix (M-PP1) content but not for the xylene cold insoluble (XCI) content may be a bit decreased.

On the other hand the elastomeric propylene copolymer (E-PP1) content, i.e. the xylene cold soluble (XCS) content, in the heterophasic propylene copolymer (HECO-1) is preferably in the range of 10.0 to 30.0 wt %, more preferably in the range of 10.0 to 25.0 wt %, most preferably of 12.0 to 20.0 wt %.

The polypropylene matrix (M-PP1) is preferably a random propylene copolymer (R-PP1) or a propylene homopolymer (H-PP1), the latter being especially preferred.

Accordingly the comonomer content of the polypropylene matrix (M-PP1) is equal or below 1.0 wt %, yet more preferably not more than 0.8 wt %, still more preferably not more than 0.5 wt %, like not more than 0.2 wt %.

As mentioned above the polypropylene matrix (M-PP1) is preferably a propylene homopolymer (H-PP1).

The expression propylene homopolymer used in the instant invention relates to a polypropylene that consists substantially, i.e. of more than 99.7 wt %, still more preferably of at least 99.8 wt %, of propylene units. In a preferred embodiment only propylene units in the propylene homopolymer are detectable.

In case the polypropylene matrix (M-PP1) is a random propylene copolymer (R-PP1) it is appreciated that the random propylene copolymer (R-PP1) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably a random propylene copolymer (R-PP1) according to this invention comprises, especially consists of, monomers copolymerizable with propylene from the group consisting of ethylene, 1-butene and 1-hexene. More specifically the random propylene copolymer (R-PP1) of this invention comprises—apart from propylene—units derivable from ethylene and/or 1-butene. In a preferred embodiment the random propylene copolymer (R-PP1) comprises units derivable from ethylene and propylene only.

Additionally it is appreciated that the random propylene copolymer (R-PP1) has preferably a comonomer content in the range of more than 0.3 to 1.0 wt %, more preferably in the range of more than 0.3 to 0.8 wt %, yet more preferably in the range of 0.3 to 0.7 wt %.

The term "random" indicates that the comonomers of the random propylene copolymers (R-PP1) are randomly distributed within the propylene copolymer. The term "random" is understood according to IUPAC (Glossary of basic terms in polymer science; IUPAC recommendations 1996).

The polypropylene matrix (M-PP1) of the heterophasic propylene copolymer (HECO-1), preferably the polypropylene matrix (M-PP1) being the propylene homopolymer (H-PP1), can be unimodal, bimodal or multimodal in view of the molecular weight, preferably it is unimodal in view of the molecular weight.

The expressions "unimodal", "multimodal" or "bimodal" used throughout the present invention refer to the modality of the polymer, i.e.
the form of its molecular weight distribution curve, which is the graph of the molecular weight fraction as a function of its molecular weight, and/or
the form of its comonomer content distribution curve, which is the graph of the comonomer content as a function of the molecular weight of the polymer fractions.

As will be explained below, the heterophasic propylene copolymers as well their individual components (matrix and elastomeric copolymer) can be produced by blending different polymer types, i.e. of different molecular weight and/or comonomer content. However, it is preferred that the heterophasic propylene copolymers as well as their individual components (matrix and elastomeric copolymer) are produced in a sequential step process, using reactors in serial configuration and operating at different reaction conditions. As a consequence, each fraction prepared in a specific reactor will have its own molecular weight distribution and/or comonomer content distribution.

Further it is appreciated that the polypropylene matrix (M-PP1) of the heterophasic propylene copolymer (HECO-1) has a rather high melt flow MFR$_2$ (230° C.). As stated above the xylene cold insoluble (XCI) fraction of a heterophasic propylene copolymer is essentially identical with the matrix of said heterophasic propylene copolymer. Accordingly the melt flow rate MFR$_2$ (230° C.) of the polypropylene matrix (M-PP1) equates with the melt flow rate MFR$_2$ (230° C.) of the xylene cold insoluble (XCI) fraction of the heterophasic propylene copolymer (HECO-1). Accordingly, it is preferred that the xylene cold insoluble (XCI) fraction of the heterophasic propylene copolymer (HECO-1) has a melt flow rate MFR$_2$ (230° C.) measured according to ISO 1133 of 50.0 to 700.0 g/10 min, more preferably of 80.0 to 400.0 g/10 min, still more preferably of 120.0 to 250.0 g/10 min.

Preferably the polypropylene matrix (M-PP1) is isotactic. Accordingly it is appreciated that the polypropylene matrix (M-PP1) has a rather high isotactic pentad concentration, i.e. higher than 80%, more preferably higher than 85%, yet more preferably higher than 90%, still more preferably higher than 92%, still yet more preferably higher than 93%, like higher than 95%.

The second component of the heterophasic propylene copolymer (HECO-1) is the elastomeric propylene copolymer (E-PP1).

The elastomeric propylene copolymer (E-PP1) comprises, preferably consists of, units derivable from (i) propylene and (ii) ethylene and/or at least another C$_4$ to C$_{12}$ α-olefin, like C$_4$ to C$_{10}$ α-olefin, more preferably units derivable from (i) propylene and (ii) ethylene and/or at least another α-olefin selected form the group consisting of 1-butene, 1-pentene, 1-hexene, 1-heptene and 1-octene.

Accordingly the elastomeric propylene copolymer (E-PP1) comprises at least units derivable from propylene and ethylene and may comprise other units derivable from a further α-olefin as defined in the previous paragraph. However, it is in particular preferred that elastomeric propylene copolymer (E-PP1) comprises units only derivable from propylene and ethylene. Thus an ethylene propylene rubber (EPR1) as elastomeric propylene copolymer (E-PP1) is especially preferred.

Like the polypropylene matrix (M-PP1) the elastomeric propylene copolymer (E-PP1) can be unimodal or multimodal, like bimodal, the latter being preferred. Concerning the definition of unimodal and multimodal, like bimodal, it is referred to the definition above.

In the present invention the content of units derivable from propylene in the elastomeric propylene copolymer (E-PP1) equates with the content of propylene detectable in the xylene cold soluble (XCS) fraction. Accordingly the propylene detectable in the xylene cold soluble (XCS) fraction ranges from 55.0 to 75.0 wt %, more preferably 57.0 to 70.0 wt %, most preferably 59.0 to 67.0 wt %. Thus in a specific embodiment the elastomeric propylene copolymer (E-PP1), i.e. the xylene cold soluble (XCS) fraction, comprises from 25.0 to 45.0 wt %, more preferably 30.0 to 43.0 wt %, most preferably 33.0 to 41.0 wt %, units derivable from comonomers other than propylene, like ethylene. Preferably the elastomeric propylene copolymer (E-PP1) is an ethylene propylene rubber (EPR1), with a propylene and/or ethylene content as defined in this paragraph.

A further preferred requirement of the present invention is that the intrinsic viscosity (IV) of the xylene cold soluble (XCS) fraction of the heterophasic propylene copolymer (HECO-1) is in a moderate range. Accordingly it is appreciated that the intrinsic viscosity of the xylene cold soluble (XCS) fraction of the heterophasic propylene copolymer (HECO-1) is in a range of 1.5 to 4.0 dl/g. Also, the intrinsic viscosity (IV) should be not too high otherwise the flowability is decreased. Thus the intrinsic viscosity of the xylene cold soluble (XCS) fraction of the heterophasic propylene copolymer (HECO-1) is preferably in the range of 1.8 to 3.0 dl/g, more preferably in the range 2.0 to 2.8 dl/g. The intrinsic viscosity is measured according to ISO 1268 in decaline at 135° C.

Preferably the heterophasic propylene copolymer (HECO-1) is α-nucleated.

Accordingly, preferred α-nucleating agents are selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and C$_1$-C$_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene) sorbitol), nonitol,1,1,2,3,-trideoxy-4,6:5,7-bis-O-[(4-propylphenyl)methylene]-nonitol, and
(iii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and
(iv) vinylcycloalkane polymer and vinylalkane polymer, and
(v) talc.

The nucleating agent content of the heterophasic propylene copolymer (HECO-1) is preferably up to 2 wt %.

Such additives are generally commercially available and are described, for example, in Gächter/Müller, Plastics Additives Handbook, 3$^{rd}$ Edition, Hanser Publishers, Munich, 1990.

In a preferred embodiment, the heterophasic propylene copolymer (HECO-1) of the present invention contain from 0.1 to 1.0 wt %, preferably from 0.15 to 0.25 wt %, of a nucleating agent, in particular salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate]. In another preferred embodiment the heterophasic propylene copolymer (HECO-1) is α-nucleated by polymerized vinyl compounds.

In still another preferred embodiment, the heterophasic propylene copolymer (HECO-1) is α-nucleated with talc, having a talc content of from 0.1 to 1.5 wt %, preferably of from 0.5 to 1.0 wt %.

The second heterophasic propylene copolymer (HECO-2) has
a) a melt flow rate MFR$_2$ (230° C.) measured according to ISO 1133 of 0.5-20 g/10 min, and/or
b) a xylene cold soluble fraction (XCS) of 10.0 to 30.0 wt.-%, and/or
c) a total propylene content of 70.0 to 95.0 wt.-%, and/or
(d) a propylene content in the xylene cold soluble (XCS) fraction of 50.0 to 70.0 wt.-% and/or
e) an intrinsic viscosity (IV) measured according to ISO 1268-1 (decalin) of the xylene cold soluble (XCS) fraction of 3.0-5.0 dl/g.

The second heterophasic propylene copolymer (HECO-2) exhibits a medium to low melt flow which is believed by the inventors to contribute that the ethylene-α-olefin elastomer (EOE) can be evenly distributed in the polypropylene composition (PPC). The second heterophasic propylene copolymer (HECO-2) according to this invention preferably has a melt flow rate MFR$_2$ (230° C.) in the range of 0.5 to 20.0 g/10 min, more preferably in the range of 1.0 to 15.0 g/10 min, still more preferably in the range of 2 to 10.0 g/10 min.

The heterophasic propylene copolymer (HECO-2) according to this invention preferably comprises
(a) a polypropylene matrix (M-PP2) and
(b) an elastomeric propylene copolymer (E-PP2) comprising units derived from
  propylene and
  ethylene and/or $C_4$ to $C_{12}$ α-olefin.

Preferably the propylene content in the heterophasic propylene copolymer (HECO-2) is 70.0 to 95.0 wt %, more preferably 75.0 to 93.0 wt %, still more preferably 80.0 to 90.0 wt %, based on the total heterophasic propylene copolymer (H-PP2), more preferably based on the amount of the polymer components of the heterophasic propylene copolymer (HECO-2), yet more preferably based on the amount of the polypropylene matrix (M-PP2) and the elastomeric propylene copolymer (E-PP2) together. The remaining part constitute the comonomers different from propylene (ethylene and/or $C_4$ to $C_{12}$ α-olefin), preferably constitutes ethylene.

Concerning the definition of a heterophasic polypropylene, it is referred to the information provided when discussing the heterophasic propylene copolymer (HECO-1). Accordingly the heterophasic propylene copolymer (HECO-2) comprises as polymer components only the polypropylene matrix (M-PP2) and the elastomeric propylene copolymer (E-PP2). In other words, the heterophasic propylene copolymer (HECO-2) may contain further additives but no other polymer in an amount exceeding 5 wt %, more preferably exceeding 3 wt %, like exceeding 1 wt %, based on the total heterophasic propylene copolymer (HECO-2), more preferably based on the polymers present in the heterophasic propylene copolymer (HECO-2). One additional polymer which may be present in such low amounts is a polyethylene which is a reaction product obtained by the preparation of the heterophasic propylene copolymer (HECO-2). Accordingly it is in particular appreciated that a heterophasic propylene copolymer (HECO-2) as defined in the instant invention contains only a polypropylene matrix (M-PP2), an elastomeric propylene copolymer (E-PP2) and optionally a polyethylene in amounts as mentioned in this paragraph. Further, throughout the present invention the xylene cold insoluble (XCI) fraction of the heterophasic propylene copolymer (HECO-2) represents the matrix (M-PP2) and optionally the polyethylene whereas the xylene cold soluble (XCS) fraction represents the elastomeric part of the heterophasic propylene copolymer (HECO-2), i.e. the elastomeric propylene copolymer (E-PP2).

Accordingly the polypropylene matrix (M-PP2) content, i.e. the xylene cold insoluble (XCI) content, in the heterophasic propylene copolymer (HECO-2) is preferably in the range of 70.0 to 90.0 wt.-%, more preferably in the range of 73.0 to 87.0 wt.-%, like 75.0 to 85.0 wt.-%. In case polyethylene is present in the heterophasic propylene copolymer (HECO-2), the values for the polypropylene matrix (M-PP2) content but not for the xylene cold insoluble (XCI) content may be a bit decreased.

On the other hand the elastomeric propylene copolymer (E-PP2) content, i.e. the xylene cold soluble (XCS) content, in the heterophasic propylene copolymer (HECO-2) is preferably in the range of 10.0 to 30.0 wt.-%, preferably in the range of 13.0 to 27.0 wt.-%, more preferably in the range of 15.0 to 25.0 wt.-%.

Accordingly the elastomeric propylene copolymer (E-PP2) content, i.e. the xylene cold soluble (XCS) content, in the heterophasic propylene copolymer (HECO-2) is preferably higher compared to the elastomeric propylene copolymer (E-PP1) content, i.e. the xylene cold soluble (XCS) content, in the heterophasic propylene copolymer (HECO-1). Thus it is appreciated that the amount of xylene cold soluble (XCS) content of the heterophasic polypropylene (HECO-1) measured according to ISO 6427 is lower, preferably at least 1.0 wt.-%, more preferably at least 3.0 wt.-% lower, compared to the xylene cold soluble (XCS) content of the heterophasic polypropylene (HECO-2) measured according to ISO 6427. Accordingly it is appreciated that following formula (I), preferably (Ia), is fulfilled $$XCS(HECO-1) \leq 1.2 \times XCS(HECO-2) \quad (I)$$

$$XCS(HECO-1) \leq 1.3 \times XCS(HECO-2) \quad (Ia)$$

wherein
XCS (HECO-1) is the xylene soluble content measured according to ISO 6427 given in weight percentage of the heterophasic propylene copolymer (HECO-1), and
XCS (HECO-2) is the xylene soluble content measured according to ISO 6427 given in weight percentage of the heterophasic propylene copolymer (HECO-2).

Further, the polypropylene matrix (M-PP2) is preferably a random propylene copolymer (R-PP2) or a propylene homopolymer (H-PP2), the latter especially preferred.

Accordingly the comonomer content of the polypropylene matrix (M-PP2) is equal or below 1.0 wt %, yet more preferably not more than 0.8 wt %, still more preferably not more than 0.5 wt %, like not more than 0.2 wt %.

As mentioned above the polypropylene matrix (M-PP2) is preferably a propylene homopolymer (H-PP2).

In case the polypropylene matrix (M-PP2) is a random propylene copolymer (R-PP2) it is appreciated that the random propylene copolymer (R-PP2) comprises monomers copolymerizable with propylene, for example comonomers such as ethylene and/or $C_4$ to $C_{12}$ α-olefins, in particular ethylene and/or $C_4$ to $C_8$ α-olefins, e.g. 1-butene and/or 1-hexene. Preferably the random propylene copolymer (R-PP2) according to this invention comprises, especially consists of, monomers copolymerizable with propylene from the group consisting of ethylene, 1-butene and 1-hexene. More specifically the random propylene copolymer (R-PP2) of this invention comprises—apart from propylene—units derivable from ethylene and/or 1-butene. In a preferred embodiment the random propylene copolymer (R-PP2) comprises units derivable from ethylene and propylene only.

Additionally it is appreciated that the random propylene copolymer (R-PP2) has preferably a comonomer content in the range of more than 0.3 to 1.0 wt %, more preferably in the range of more than 0.3 to 0.8 wt %, yet more preferably in the range of 0.3 to 0.7 wt %.

The polypropylene matrix (M-PP2) of the heterophasic propylene copolymer (HECO-2), preferably the polypropylene matrix (M-PP2) being the propylene homopolymer (H-PP2), can be unimodal or multimodal, like bimodal, in view of the molecular weight.

Further and preferably the polypropylene matrix (M-PP2) has a rather low melt flow rate.

Accordingly, it is preferred that in the present invention the polypropylene matrix (M-PP2), i.e. the xylene cold insoluble (XCI) fraction of the heterophasic propylene copolymer (HECO-2), has an $MFR_2$ (230° C.) in a range of 0.5 to 30.0 g/10 min, more preferably of 1.0 to 25.0 g/10 min, still more preferably of 3.0 to 15.0 g/10 min.

Preferably the polypropylene matrix (M-PP2) is isotactic. Accordingly it is appreciated that the polypropylene matrix (M-PP2) has a rather high isotactic pentad concentration, i.e. higher than 80%, more preferably higher than 85%, yet more preferably higher than 90%, still more preferably higher than 92%, still yet more preferably higher than 93%, like higher than 95%.

The second component of the heterophasic propylene copolymer (HECO-2) is the elastomeric propylene copolymer (E-PP2).

The elastomeric propylene copolymer (E-PP2) comprises, preferably consists of, units derivable from (i) propylene and (ii) ethylene and/or at least another $C_4$ to $C_{12}$ α-olefin, like $C_4$ to $C_{10}$ α-olefin, more preferably units derivable from (i) propylene and (ii) ethylene and at least another α-olefin selected form the group consisting of 1-butene, 1-hexene and 1-octene. It is preferred that the elastomeric copolymer consists of units derivable from (i) propylene and (ii) ethylene and/or $C_4$ to $C_{12}$ α-olefins only.

Accordingly the elastomeric propylene copolymer (E-PP2) comprises at least units derivable from propylene and ethylene and may comprise other units derivable from a further α-olefin as defined in the previous paragraph. However, it is in particular preferred that elastomeric propylene copolymer (E-PP2) comprises units only derivable from propylene and ethylene. Thus an ethylene propylene rubber (EPR2) as elastomeric copolymer (E-PP2) is especially preferred.

Like the polypropylene matrix (M-PP2) the elastomeric propylene copolymer (E-PP2) can be unimodal or multimodal, like bimodal. Concerning the definition of unimodal and multimodal, like bimodal, it is referred to the definition above.

In the present invention the content of units derivable from propylene in the elastomeric propylene copolymer (E-PP2) equates with the content of propylene detectable in the xylene cold soluble (XCS) fraction. Accordingly the propylene detectable in the xylene cold soluble (XCS) fraction ranges from 50.0 to 70.0 wt %, more preferably 55.0 to 65.0 wt.-%. Thus in a specific embodiment the elastomeric propylene copolymer (E-PP2), i.e. the xylene cold soluble (XCS) fraction, comprises from 30.0 to 50.0 wt.-%, more preferably 35.0 to 45.0 wt.-%, units derivable from ethylene and/or $C_4$ to $C_{12}$. Preferably the elastomeric propylene copolymer (E-PP2) is an ethylene propylene rubber (EPR2), with a propylene and/or ethylene content as defined in this paragraph.

To achieve an especially good balance between stiffness and impact the intrinsic viscosity of the xylene cold soluble (XCS) fraction of the two heterophasic polypropylenes, shall preferably differ. Thus it is appreciated that the intrinsic viscosity (IV) measured according to ISO 1268-1 (decalin) of the xylene cold soluble (XCS) fraction of the heterophasic propylene copolymer (HECO-1) is lower compared to the intrinsic viscosity (IV) measured according to ISO 1268-1 (decalin) of the xylene cold soluble (XCS) fraction of the heterophasic propylene copolymer (HECO-2).

Accordingly it is preferred that the intrinsic viscosity (IV) of the xylene cold soluble (XCS) fraction of the heterophasic propylene copolymer (HECO-2) is rather high. Accordingly it is appreciated that the intrinsic viscosity of the xylene cold soluble (XCS) fraction of the heterophasic propylene copolymer (HECO-2) is above 2.5 dl/g, more preferably above 2.8 dl/g. Even more preferred the intrinsic viscosity of the xylene cold soluble (XCS) fraction of the heterophasic propylene copolymer (HECO-2) is in the range of 3.0 to 5.0 dl/g, preferably in the range of 3.2 to 4.2 dl/g.

Preferably the heterophasic propylene copolymer (HECO-2) is α-nucleated. If not stated otherwise below, the explanations given above for the α-nucleation of the heterophasic propylene copolymer (HECO-1) also apply for the heterophasic propylene copolymer (HECO-2).

The nucleating agent content of the heterophasic propylene copolymer (HECO-2) is preferably up to 2 wt %.

In a preferred embodiment, the heterophasic propylene copolymer (HECO-2) of the present invention contain from 0.1 to 1.0 wt %, preferably from 0.15 to 0.25 wt %, of a nucleating agent, in particular salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate]. In another preferred embodiment the heterophasic propylene copolymer (HECO-2) is α-nucleated by polymerized vinyl compounds.

In still another preferred embodiment, the heterophasic propylene copolymer (HECO-2) is α-nucleated with talc, having a talc content of from 0.1 to 1.5 wt %, preferably of from 0.2 to 1.0 wt %.

One aspect of the present invention is that the final composition shall be featured by good flowability.

Accordingly it is appreciated that the inventive polypropylene composition (PPC) is featured by a sufficiently high melt flow rate. Especially good results are achievable in case the inventive polypropylene composition (PPC) comprises a higher melt flow heterophasic propylene copolymer (HECO-1), and a lower melt flow heterophasic propylene copolymer (HECO-2), as defined above. It is in particular preferred that the two heterophasic propylene copolymers (HECO-1) and (HECO-2) differ in their melt flow rates. Accordingly in one specific aspect of the present invention the melt flow rate $MFR_2$ (230° C.) of the heterophasic propylene copolymer (HECO-1), is higher than the melt flow rate $MFR_2$ (230° C.) of the heterophasic propylene copolymer (HECO-2). More specifically it is appreciated that the melt flow rate $MFR_2$ (230° C.) of the high melt flow heterophasic propylene copolymer (HECO-1), is at least 5 g/10 min, more preferably at least 10 g/10 min, higher than the melt flow rate $MFR_2$ (230° C.) of the. heterophasic propylene copolymer (HECO-2).

Accordingly in one preferred embodiment of the present invention, the instant composition comprises
(a) 20 to 75 wt %, preferably 30 to 50 wt % of a first heterophasic propylene copolymer (HECO-1), preferably having a $MFR_2$ (230° C. in the range of 65.0 to 300.0 g/10 min, more preferably in the range of 75.0 to 200.0 g/10 min, still more preferably 85.0 to 180.0 g/10 min, most preferably of 90.0 to 120 g/10 min, and
(b) 15 to 50 wt.-%, preferably 20 to 45 wt.-% of a second heterophasic propylene copolymer (HECO-2), preferably having a $MFR_2$ (230° C.) in the range of 0.5 to 20.0 g/10 min, more preferably in the range of 1.0 to 15.0 g/10 min, still more preferably in the range of 2.0 to 10.0 g/10 min, based on the total weight of the composition.

According to an embodiment the ethylene-α-olefin elastomer (EOE)
a) has a density measured according to ISO 1183-187 of ≤870 $kg/m^3$, preferably of 850-870 $kg/m^3$ and/or
b) the α-olefin comonomer of the ethylene-α-olefin elastomer (EOE) is a $C_4$-$C_{10}$ α-olefin, preferably 1-butene or 1-hexene or 1-octene.

The composition of the present invention further comprises an ethylene-α-olefin elastomer (EOE). The ethylene-α-olefin elastomer (EOE) is/are (chemically) different to the elastomeric copolymers (E-PP1) and (E-PP2) of the heterophasic systems discussed above.

The ethylene-α-olefin elastomer (EOE), has preferably a density measured according to ISO 1183-1 of ≤870 kg/m$^3$, preferably of 850-870 kg/m$^3$, more preferably in the range of 855 to 865 kg/m$^3$1.

Preferably the ethylene-α-olefin elastomer (EOE), is featured by a rather low specific melt flow rate, namely by a melt flow rate MFR$_2$ (190° C.) measured according to ISO 1133 of smaller than 0.5 g/10 min, preferably from 0.05-0.50, more preferably from 0.10-0.45, still more preferably from 0.15-0.40 g/10 min, most preferably from 0.20-0.40 g/10 min.

In a preferred embodiment the ethylene-α-olefin elastomer (EOE), is a copolymer containing as a major part units derivable from ethylene. Accordingly it is appreciated that the ethylene-α-olefin elastomer (EOE) comprises at least 50.0 wt % units derivable from ethylene, more preferably at least 55.0 wt % of units derived from ethylene. Thus it is appreciated that the ethylene-α-olefin elastomer (EOE) comprises 50.0 to 80.0 wt %, more preferably 55.0 to 75 wt %, units derivable from ethylene.

The comonomers, i.e. the α-olefin(s), present in the ethylene-α-olefin elastomer (EOE), are C$_4$ to C$_{20}$ α-olefins, like 1-butene, 1-hexene and 1-octene, 1-butene being especially preferred. Accordingly in one specific embodiment the ethylene-α-olefin elastomer (EOE) is an ethylene-1-butene copolymer with the amounts given in this paragraph.

According to an advantageous embodiment, the polypropylene composition (PPC) comprises a reinforcing mineral filler (F) in an amount of up to 10 wt %.

Reinforcing mineral fillers a commonly used in the art in polymeric compositions, e.g. in order to improve mechanical properties, in particular the stiffness of the composition.

The above specified amount of mineral filler (F) is sufficient to achieve this effect, i.e. to improve the stiffness of the inventive polypropylene composition (PPC). The above specified amount of mineral filler (F) is however small enough, that the polypropylene composition (PPC) of the invention are lightweight compositions and fulfil the requirement of low density.

The reinforcing mineral filler (F) suitable according to the invention is limited to mineral fillers characterized by a significant particle anisotropy, i.e. being of platelet or needle shape. Preferably the reinforcing mineral filler (F) is phyllosilicate, mica or wollastonite. More preferably the reinforcing mineral filler (F) is selected from the group consisting of mica, wollastonite, smectite, montmorillonite and talc. Still more preferably the reinforcing mineral filler (F) is talc. A commercially available example of a suitable reinforcing mineral filler (F) is the talc HAR T84 of Luzenac.

If present the reinforcing mineral filler (F) is contained in an amount of more than 1.0 to 10.0 wt %, preferably of 2.0 to 8.0 wt %, based on the total weight of the composition of the present invention. More preferably, the filler (F) is present in an amount of 3.0 to 7.0 wt %.

The mineral filler (F) preferably has an average particle size d$_{50}$ (Laser Diffraction) of 0.8 to 25.0 μm, more preferably of 2.5 to 15.0 μm.

According to an embodiment of the present invention,
a) the polypropylene composition (PPC) does not contain high density polyethylene (HDPE) and/or
b) the polypropylene composition (PPC) does not contain inorganic antiblocking agent.

HDPE is usually added to automotive compositions in order to improve their scratch resistance. The polypropylene compositions (PPC) of the present invention, however, exhibit a sufficiently high degree of scratch resistance, such that the addition of HDPE is not required. Also, the addition of HDPE typically results in a higher gloss, which is not desired. The polypropylene compositions (PPC) of the present invention are particularly free of high density polyethylene (HDPE) having a density measured according to ISO 1183-187 of at least 940 kg/m$^3$.

Preferably the polypropylene compositions (PPC) of the present invention are also free of inorganic anti-blocking agents.

Anti-blocking agents are known in the art for preventing or reducing the adhesion of two adjacent film layers by roughening their surfaces. In automotive compositions, anti-blocking agents are, however, sometimes used for reducing the gloss of a polymer surface. The polypropylene compositions (PPC) of the invention, however, already exhibit a very low gloss, so that the extra addition of anti-blocking agent is not required. The polypropylene compositions (PPC) of the present invention are particularly free of inorganic anti-blocking agents, examples of which include natural and synthetic silica (mined and manufactured silicon dioxide), cross-linked polymeric spheres, ceramic spheres (such as manufactured alumina-silicate ceramic), and zeolites.

Further, the polypropylene composition (PPC) of the present invention does preferably not contain ethylene-α-olefin-diene copolymers.

Still further, the polypropylene composition (PPC) of the present invention does preferably not contain organic, like cellulose-based filler.

The polypropylene composition (PPC) of the present invention may further contain additional additives other than the optional reinforcing mineral filler (F). For instance it is appreciated that the composition comprises acid scavengers, antioxidants, nucleating agents, hindered amine light stabilizers, and pigments. Preferably the amount of additives in the composition shall not exceed 5 wt %, more preferably shall not exceed 3.5 wt %, like not more than 2.0 wt %, within the instant composition.

All components used for the preparation of the instant composition are known. Accordingly also their preparation is well known. For instance the heterophasic polypropylenes according to this invention are preferably produced in a multistage process known in the art, wherein the matrix is produced at least in one slurry reactor and subsequently the elastomeric copolymer is produced at least in one gas phase reactor.

Thus, the polymerization system can comprise one or more conventional stirred slurry reactors and/or one or more gas phase reactors. Preferably the reactors used are selected from the group of loop and gas phase reactors and, in particular, the process employs at least one loop reactor and at least one gas phase reactor. It is also possible to use several reactors of each type, e.g. one loop and two or three gas phase reactors, or two loops and one or two gas phase reactors, in series.

Preferably the process comprises also a prepolymerisation with the chosen catalyst system, as described in detail below, comprising the Ziegler-Natta procatalyst, the external donor and the cocatalyst.

In a preferred embodiment, the prepolymerisation is conducted as bulk slurry polymerization in liquid propylene, i.e. the liquid phase mainly comprises propylene, with minor amounts of other reactants and optionally inert components dissolved therein.

The prepolymerisation reaction is typically conducted at a temperature of 0 to 50° C., preferably from 10 to 45° C., and more preferably from 15 to 40° C.

The pressure in the prepolymerisation reactor is not critical but must be sufficiently high to maintain the reaction mixture in liquid phase. Thus, the pressure may be from 20 to 100 bar, for example 30 to 70 bar.

The catalyst components are preferably all introduced to the prepolymerisation step. However, where the solid catalyst component (i) and the cocatalyst (ii) can be fed separately it is possible that only a part of the cocatalyst is introduced into the prepolymerisation stage and the remaining part into subsequent polymerization stages. Also in such cases it is necessary to introduce so much cocatalyst into the prepolymerisation stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

A slurry reactor designates any reactor, such as a continuous or simple batch stirred tank reactor or loop reactor, operating in bulk or slurry in which the polymer forms in particulate form. "Bulk" means a polymerization in reaction medium that comprises at least 60 wt % monomer. According to a preferred embodiment the slurry reactor comprises a bulk loop reactor.

"Gas phase reactor" means any mechanically mixed or fluid bed reactor. Preferably the gas phase reactor comprises a mechanically agitated fluid bed reactor with gas velocities of at least 0.2 m/sec.

The particularly preferred embodiment for the preparation of the heterophasic polypropylenes of the invention comprises carrying out the polymerization in a process comprising either a combination of one loop and one or two gas phase reactors or a combination of two loops and one or two gas phase reactors.

A preferred multistage process is a slurry-gas phase process, such as developed by Borealis and known as the Borstar® technology. In this respect, reference is made to EP 0 887 379 A1, WO 92/12182, WO 2004/000899, WO 2004/111095, WO 99/24478, WO 99/24479 and WO 00/68315. They are incorporated herein by reference.

A further suitable slurry-gas phase process is the Spheripol® process of Basell.

Preferably the heterophasic polypropylene composition according to this invention are produced by using a special Ziegler-Natta procatalyst in combination with a special external donor, as described below in detail, preferably in the Spheripol® or in the Borstar®-PP process.

One preferred multistage process may therefore comprise the steps of:
 producing a polypropylene matrix in the presence of the chosen catalyst system, as for instance described in detail below, comprising the special Ziegler-Natta procatalyst (i), an external donor (iii) and the cocatalyst (ii) in a first slurry reactor and optionally in a second slurry reactor, both slurry reactors using the same polymerization conditions,
 transferring the slurry reactor product into at least one first gas phase reactor, like one gas phase reactor or a first and a second gas phase reactor connected in series,
 producing an elastomeric copolymer in the presence of the polypropylene matrix and in the presence of the catalyst system in said at least first gas phase reactor,
 recovering the polymer product for further processing.

With respect to the above-mentioned preferred slurry-gas phase process, the following general information can be provided with respect to the process conditions.

Temperature is preferably from 40 to 110° C., preferably between 50 and 100° C., in particular between 60 and 90° C., with a pressure in the range of from 20 to 80 bar, preferably 30 to 60 bar, with the option of adding hydrogen in order to control the molecular weight in a manner known per se.

The reaction product of the slurry polymerization, which preferably is carried out in a loop reactor, is then transferred to the subsequent gas phase reactor(s), wherein the temperature preferably is within the range of from 50 to 130° C., more preferably 60 to 100° C., at a pressure in the range of from 5 to 50 bar, preferably 8 to 35 bar, again with the option of adding hydrogen in order to control the molecular weight in a manner known per se.

The average residence time can vary in the reactor zones identified above. In one embodiment, the average residence time in the slurry reactor, for example a loop reactor, is in the range of from 0.5 to 5 hours, for example 0.5 to 2 hours, while the average residence time in the gas phase reactor generally will be from 1 to 8 hours.

If desired, the polymerization may be effected in a known manner under supercritical conditions in the slurry, preferably loop reactor, and/or as a condensed mode in the gas phase reactor.

According to the invention the heterophasic polypropylenes are preferably obtained by a multistage polymerization process, as described above, in the presence of a catalyst system comprising as component (i) a Ziegler-Natta procatalyst which contains a transesterification product of a lower alcohol and a phthalic ester.

The procatalyst used according to the invention is prepared by
 a) reacting a spray crystallized or emulsion solidified adduct of $MgCl_2$ and a $C_1$-$C_2$ alcohol with $TiCl_4$
 b) reacting the product of stage a) with a dialkylphthalate of formula (I)

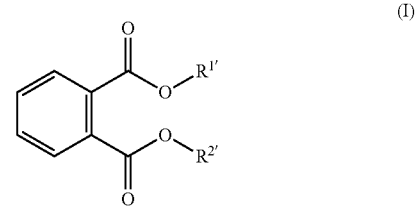

(I)

wherein $R^{1'}$ and $R^{2'}$ are independently at least a $C_5$ alkyl under conditions where a transesterification between said $C_1$ to $C_2$ alcohol and said dialkylphthalate of formula (I) takes place to form the internal donor
 c) washing the product of stage b) or
 d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2$*nROH, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula $MgCl_2*nROH$, wherein R is methyl or ethyl, preferably ethyl and n is 1 to 6, is contacting with $TiCl_4$ to form a titanised carrier, followed by the steps of adding to said titanised carrier
(i) a dialkylphthalate of formula (I) with $R^{1'}$ and $R^{2'}$ being independently at least a $C_5$-alkyl, like at least a $C_8$-alkyl,
or preferably
(ii) a dialkylphthalate of formula (I) with $R^{1'}$ and $R^{2'}$ being the same and being at least a $C_5$-alkyl, like at least a $C_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

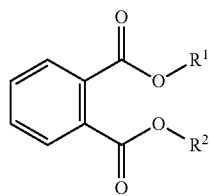

(II)

with $R^1$ and $R^2$ being methyl or ethyl, preferably ethyl, the dialkylphthalat of formula (II) being the internal donor and
recovering said transesterification product as the procatalyst composition (component (i)).

The adduct of the formula $MgCl_2*nROH$, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BC-1 catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from Grace.

In a further embodiment, the Ziegler-Natta procatalyst can be modified by polymerising a vinyl compound in the presence of the catalyst system, comprising the special Ziegler-Natta procatalyst, an external donor and a cocatalyst, which vinyl compound has the formula:

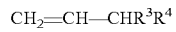

wherein $R^3$ and $R^4$ together form a 5- or 6-membered saturated, unsaturated or aromatic ring or independently represent an alkyl group comprising 1 to 4 carbon atoms, and the modified catalyst is used for the preparation of the heterophasic polypropylene composition according to this invention. The polymerized vinyl compound can act as an α-nucleating agent.

Concerning the modification of catalyst reference is made to the international applications WO 99/24478, WO 99/24479 and particularly WO 00/68315, incorporated herein by reference with respect to the reaction conditions concerning the modification of the catalyst as well as with respect to the polymerization reaction.

For the production of the heterophasic polypropylenes according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (III)

(III)

wherein $R^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that $R^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

More preferably the external donor is either dicyclopentyl dimethoxy silane [$Si(OCH_3)_2(cyclo-pentyl)_2$] or diisopropyl dimethoxy silane [$Si(OCH_3)_2(CH(CH_3)_2)_2$].

For mixing the individual components of the instant composition, a conventional compounding or blending apparatus, e.g. a Banbury mixer, a 2-roll rubber mill, Buss-co-kneader or a twin screw extruder may be used. The polymer materials recovered from the extruder are usually in the form of pellets. These pellets are then preferably further processed, e.g. by injection moulding to generate articles and products of the inventive composition.

Accordingly the present invention is also directed to a process for the preparation of the instant composition comprising the steps of adding the polymer components with, inter alia the at least two heterophasic propylene copolymers (HECOs), the ethylene-α-olefin elastomer (EOE), the optional mineral filler (F), and optionally other additives to an extruder (as mentioned above) and extruding the same obtaining thereby said polypropylene composition (PPC).

According to a preferred embodiment of the present invention, it relates to a polypropylene composition (PPC) having a melt flow rate $MFR_2$ (230° C.) measured according to ISO 1133 of 9.0 to 20.0 g/10 min, the composition comprising
a) a first heterophasic propylene copolymer (HECO-1) in an amount of 20-75 wt % and
b) a second heterophasic propylene copolymer (HECO-2) in an amount of 5-50 wt % and
c) an ethylene-α-olefin elastomer (EOE) in an amount of 5-25 wt % and
d) a reinforcing mineral filler (F) in an amount of 1-10 wt %, based on the total weight of the composition.

According to a still further preferred embodiment, the invention relates to a polypropylene composition (PPC) having a melt flow rate $MFR_2$ (230° C.) measured according to ISO 1133 of 9.0 to 20.0 g/10 min, the composition comprising
a) a first heterophasic propylene copolymer (HECO-1) in an amount of 25-50 wt %, preferably 30-40 wt % and
b) a second heterophasic propylene copolymer (HECO-2) in an amount of 25-50 wt %, preferably 30-40 wt % and
c) an ethylene-α-olefin elastomer (EOE) in an amount of 10-20 wt % and
d) a reinforcing mineral filler (F) in an amount of 2-8 wt %, based on the total weight of the composition.

The polypropylene-based composition according to the invention may be pelletized and compounded using any of the variety of compounding and blending methods well known and commonly used in the resin compounding art.

The current invention also provides (automotive) articles, like injection molded articles, comprising at least to 60 wt.-%, more preferably at least 80 wt.-%, yet more preferably at least 95 wt.-%, like consisting, of the inventive composition. Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive polypropylene composition.

EXAMPLES

The following definitions of terms and determination methods apply for the above general description of the invention as well as to the below examples unless otherwise defined.

1. Measuring Methods

The Density was measured according to ISO 1183-1—method A (2004). Sample preparation is done by compression moulding in accordance with ISO 1872-2:2007.

$MFR_2$ (230° C.) was measured according to ISO 1133 (230° C., 2.16 kg load).

$MFR_2$ (190° C.) was measured according to ISO 1133 (190° C., 2.16 kg load).

Comonomer content in polypropylene was determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Quantitative results are obtained based upon reference to the film thickness.

The content of xylene cold solubles (XCS, wt.-%) is determined at 25° C. according ISO 16152; first edition; 2005 Jul. 1.

The intrinsic viscosity was measured according to DIN ISO 1628/1, October 1999 (in decalin at 135° C.).

Flexural modulus was measured according to ISO 178 using injection molded test specimen as described in EN ISO 1873-2 with dimensions of 80×10×4 $mm^3$. Crosshead speed was 2 mm/min for determining the flexural modulus.

Charpy impact test: The Charpy notched impact strength (Charpy NIS) is measured according to ISO 179-1/1eA/DIN 53453 at 23° C. and −20° C., using injection molded bar test specimens of 80×10×4 $mm^3$ prepared in accordance with ISO 294-1:1996.

Shrinkage (SH) radial; Shrinkage (SH) tangential were determined on centre gated, injection moulded circular disks (diameter 180 mm, thickness 3 mm, having a flow angle of 355° and a cut out of 5°). Two specimens are moulded applying two different holding pressure times (10 s and 20 s respectively). The melt temperature at the gate is 260° C., and the average flow front velocity in the mould 100 mm/s. Tool temperature: 40° C., back pressure: 600 bar.

After conditioning the specimen at room temperature for 96 hours the dimensional changes radial and tangential to the flow direction are measured for both disks. The average of respective values from both disks are reported as final results.

Average particle size d50 (Laser diffraction) is calculated from the particle size distribution [mass percent] as determined by laser diffraction (Mastersizer) according to ISO 13320-1.

The gloss was measured according to DIN 67530 at an angle of 60° on injection moulded grained specimens.

2. Examples

Four polymer compositions according to the present invention (IE: inventive examples) and four comparative compositions (CE: comparative examples) were prepared. The components of the compositions are listed in Tables 1 and 2 below. The polymer compositions were prepared in a conventional manner by melt blending the components.

TABLE 1

The heterophasic propylene copolymers (HECOs) used

|  |  | HECO 1 | HECO 2 | HECO 3 | HECO 4 |
|---|---|---|---|---|---|
| $MFR_2$ total | [g/10 min] | 100 | 4.0 | 3.0 | 0.25 |
| $MFR_2$ of XCl | [g/10 min] | 160 | 9.0 | 2.5 | 0.30 |
| XCS | [wt %] | 15.0 | 21.0 | 14.0 | 13.0 |
| C2 total | [wt %] | 7.0 | 12.3 | 3.6 | 5.1 |

TABLE 1-continued

The heterophasic propylene copolymers (HECOs) used

|  |  | HECO 1 | HECO 2 | HECO 3 | HECO 4 |
|---|---|---|---|---|---|
| C2 in XCS | [wt %] | 39 | 38 | 27 | 33 |
| IV of XCS | [dl/g] | 2.3 | 3.5 | 1.4 | 3.5 |

"HECO 1" is the commercial product BJ356MO of Borealis
"HECO 2" is the commercial product BC250MO of Borealis
"HECO 3" is the commercial product BC918CF of Borealis
"HECO 4" is the commercial product BA212E of Borealis

TABLE 2

Compositions

| Example* |  | IE1 | IE2 | IE3 | IE4 | CE1 | CE2 | CE3 | CE4 |
|---|---|---|---|---|---|---|---|---|---|
| HECO 1 | [wt %] | 37 | 54 | 37 | 35 | 70 | 39 | 58 | 37 |
| HECO 2 | [wt %] | 36 | 18 | 36 | 36 | — | — | — | 36 |
| HECO 3 | [wt %] | — | — | — | — | — | 30 | — | — |
| HECO 4 | [wt %] | — | — | — | — | — | — | 10 | — |
| EOE 1 | [wt %] | 15 | 16 | 7.5 | — | 18 | 18 | 18 | — |
| EOE 2 | [wt %] | — | — | 7.5 | — | — | — | — | — |
| EOE 3 | [wt %] | — | — | — | 15 | — | — | — | — |
| EOE 4 | [wt %] | — | — | — | — | — | — | — | 15 |
| Filler | [wt %] | 5 | 5 | 5 | 5 | 5 | 5 | 5 | 5 |
| Density | [kg/m³] | 930 | 930 | 930 | 930 | 930 | 930 | 930 | 930 |
| MFR$_2$ | [g/10 min] | 11.0 | 16.8 | 10.0 | 9.0 | 30.0 | 7.7 | 16.6 | 12.8 |
| Flexural Modulus | [MPa] | 1347 | 1411 | 1353 | 1404 | 1260 | 1375 | 1600 | 1409 |
| Impact strength (+23° C.) | [kJ/m²] | 58.4 | 10.8 | 57.8 | 53.1 | 7.6 | 49.4 | 12.6 | 49.8 |
| Impact strength (−20° C.) | [kJ/m²] | 8.8 | 6.3 | 8.0 | 7.1 | 4.6 | 6.5 | 5.9 | 6.6 |
| Gloss (60°) | [%] | 2.2 | 2.2 | 2.5 | 2.2 | 2.3 | 2.9 | 3.3 | 2.7 |
| Shrinkage | [%] | 1.13 | 1.23 | 1.09 | 1.27 | 1.34 | 1.08 | 1.11 | 1.15 |

*Rest to 100 wt.-% are additives, like antioxidants and pigments (e.g. Carbon black)
EOE 1 is the commercial product Engage HM 7487 of Dow Elastomers which is an ethylene-butene copolymer having a MFR$_2$ (190° C.) of 0.31 g/10 min and a density of 860 kg/m³. and a 1-butene content as determined by FTIR calibrated with $^{13}$C-NMR of 32.1 wt %.
EOE 2 is the commercial product Engage 8842 of Dow Elastomers which is an ethylene-octene copolymer having a MFR$_2$ (190° C.) of 1.0 g/10 min and a density of 857 kg/m³. and a 1-octene content as determined by FTIR calibrated with $^{13}$C-NMR of 39.2 wt %.
EOE 3 is the commercial product Engage HM 7387 of Dow Elastomers which is an ethylene-butene copolymer having a MFR$_2$ (190° C.) of <0.5 g/10 min and a density of 870 kg/m³.
EOE 4 is the commercial ethylene-octene copolymer Queo 8201 of Borealis having a MFR$_2$ (190° C.) of 1.0 g/10 min and a density of 882 kg/m³.
Filler is the commercial talc HAR T84 of Luzenac having a mean particle size d$_{50}$ of 11.5 μm (Mastersizer) and a specific surface (BET) of 18.5 m²/g.

The invention claimed is:

1. Polypropylene composition (PPC) having a melt flow rate MFR$_2$ (230° C.) measured according to ISO 1133 of ≥9.0 g/10 min, the composition comprising:
   a) at least two heterophasic propylene copolymers (HECOs), wherein the at least two heterophasic propylene copolymers (HECOs) are contained in a total amount of at least 50 wt %, based on the total weight of the composition,
   b) an ethylene-α-olefin elastomer (EOE) having a melt flow rate MFR$_2$ (190° C.) measured according to ISO 1133 of <0.5 g/10 min, and
   c) wherein the ratio of the MFR$_2$ of at least one of the at least two heterophasic propylene copolymers (HECOs) to the MFR$_2$ of the ethylene-α-olefin elastomer (EOE) [MFR$_2$(HECO)/MFR$_2$(EOP)] is in the range of 2/1 to 100/1, and
   d) wherein the intrinsic viscosity (IV) measured according to ISO 1628-1 (decalin) of the xylene cold soluble (XCS) fraction of at least one of the at least two heterophasic propylene copolymers (HECOs) is ≥2.5 dl/g.

2. Polypropylene composition (PPC) according to claim 1, wherein:
   a) the at least two heterophasic propylene copolymers (HECOs) are contained in a total amount of 55-85 wt. % and/or
   b) the ethylene-α-olefin elastomer (EOE) is contained in an amount of 5-25 wt %, based on the total weight of the composition.

3. Polypropylene composition (PPC) according to claim 1, wherein the polypropylene composition (PPC) comprises a first heterophasic propylene copolymer (HECO-1) and a second heterophasic propylene copolymer (HECO-2), wherein further the weight ratio between the first heterophasic propylene copolymer (HECO-1) and the second heterophasic propylene copolymer (HECO-2) [(HECO-1)/(HECO-2)] is in the range of 3/1 to 1/2.

4. Polypropylene composition (PPC) according to claim 3, wherein:
   a) the first heterophasic propylene copolymer (HECO-1) is contained in an amount of 20-75 wt. % and/or
   b) the second heterophasic propylene copolymer (HECO-2) is contained in an amount of 15-50 wt %, based on the total weight of the composition.

5. Polypropylene composition (PPC) according to claim 3, wherein the first heterophasic propylene copolymer (HECO-1) has:
   a) a melt flow rate MFR$_2$ (230° C.) measured according to ISO 1133 of 50-500 g/10 min, and/or
   b) a xylene cold soluble fraction (XCS) of 10.0 to 30.0 wt. %, and/or
   c) a total propylene content of 75.0 to 97.0 wt. %, and/or
   d) a propylene content in the xylene cold soluble (XCS) fraction of 55.0 to 75.0 wt. % and/or
   e) an intrinsic viscosity (IV) measured according to ISO 1268-1 (decalin) of the xylene cold soluble (XCS) fraction of 1.5-4.0 dl/g.

6. Polypropylene composition (PPC) according to claim 3, wherein the second heterophasic propylene copolymer (HECO-2) has:
   a) a melt flow rate MFR$_2$ (230° C.) measured according to ISO 1133 of 0.5-20 g/10 min, and/or
   b) a xylene cold soluble fraction (XCS) of 10.0 to 30.0 wt. %, and/or
   c) a total propylene content of 70.0 to 95.0 wt. %, and/or d) a propylene content in the xylene cold soluble (XCS) fraction of 50.0 to 70.0 wt. % and/or
e) an intrinsic viscosity (IV) measured according to ISO 1268-1 (decalin) of the xylene cold soluble (XCS) fraction of 3.0-5.0 dl/g.

7. Polypropylene composition (PPC) according to claim 1, wherein the ethylene-α-olefin elastomer (EOE):
   a) has a density measured according to ISO 1183-1 of 870 kg/m$^3$, preferably of 850-870 kg/m$^3$ and/or
   b) the α-olefin comonomer of the ethylene-α-olefin elastomer (EOE) is a $C_4$-$C_{10}$ α-olefin.

8. Polypropylene composition (PPC) according to claim 1, wherein the polypropylene composition (PPC) comprises:
   a reinforcing mineral filler (F) in an amount of up to 10 wt %.

9. Polypropylene composition (PPC) according to claim 8, wherein the mineral filler (F):
   a) is selected from a phyllosilicate, mica or wollastonite; and/or
   b) has an average particle size $d_{50}$ of 0.8 to 25.0 μm, more preferably of 2.5 to 15.0 μm.

10. Polypropylene composition (PPC) according to claim 1, wherein:
   a) the polypropylene composition (PPC) does not contain high density polyethylene (HDPE) and/or
   b) the polypropylene composition (PPC) does not contain inorganic antiblocking agent.

11. Automotive article comprising a polypropylene composition (PPC) according to claim 1.

* * * * *